(12) United States Patent
Matsuno et al.

(10) Patent No.: US 7,083,744 B2
(45) Date of Patent: Aug. 1, 2006

(54) TERMINAL ELECTRODE COMPOSITIONS FOR MULTILAYER CERAMIC CAPACITORS

(75) Inventors: Hisashi Matsuno, Tochigi (JP); Hiroyuki Soshi, Tochigi (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 212 days.

(21) Appl. No.: 10/670,669

(22) Filed: Sep. 25, 2003

(65) Prior Publication Data

US 2004/0144205 A1 Jul. 29, 2004

Related U.S. Application Data

(60) Provisional application No. 60/442,200, filed on Jan. 24, 2003.

(51) Int. Cl.
*H01B 1/22* (2006.01)
*B05D 5/12* (2006.01)

(52) U.S. Cl. .................. 252/512; 252/513; 427/96; 338/22 R

(58) Field of Classification Search ............ 252/512, 252/513; 427/96; 338/22 R
See application file for complete search history.

(56) References Cited

U.S. PATENT DOCUMENTS

| | | | |
|---|---|---|---|
| 3,516,949 A | 6/1970 | Hoffman | |
| 3,922,387 A | 11/1975 | Larry | |
| 4,451,869 A | 5/1984 | Sakabe et al. | |
| 4,540,604 A * | 9/1985 | Siuta | 427/97.4 |
| 4,880,567 A | 11/1989 | Prabhu et al. | |
| 4,894,273 A * | 1/1990 | Lieberman et al. | 428/137 |
| 5,035,837 A * | 7/1991 | Saeki et al. | 252/512 |
| 5,429,670 A * | 7/1995 | Miyoshi | 106/1.18 |
| 5,645,765 A | 7/1997 | Asada et al. | |
| 5,688,441 A | 11/1997 | Itagaki et al. | |
| 5,781,402 A | 7/1998 | Fujiyama et al. | |

FOREIGN PATENT DOCUMENTS

| | | |
|---|---|---|
| EP | 0 132 810 A1 | 2/1985 |
| EP | 1 122 220 A1 | 8/2001 |
| JP | 62022868 A * | 1/1987 |
| JP | 2001307549 A | 11/2001 |
| JP | 2003123533 A * | 4/2003 |

* cited by examiner

*Primary Examiner*—Mark Kopec

(57) ABSTRACT

The present invention relates to terminal electrode compositions for multilayer ceramic capacitors. More specifically, it relates to terminal electrode compositions for multilayer ceramic capacitors which have a metal oxide component selected from $SnO_2$, $V_2O_5$ and $MoO_3$. The compositions can be fired at a low temperature in a nitrogen atmosphere.

9 Claims, No Drawings

TERMINAL ELECTRODE COMPOSITIONS FOR MULTILAYER CERAMIC CAPACITORS

FIELD OF THE INVENTION

The present invention relates to terminal electrode compositions for multilayer ceramic capacitors. More specifically, it relates to terminal electrode compositions for multilayer ceramic capacitors, which compositions comprise a base metal powder, a glass frit, and metal oxide and can be fired at a low temperature in a nitrogen atmosphere.

BACKGROUND OF THE INVENTION

Electrically conductive pastes composed of a base metal such as copper or nickel and an inorganic binder dispersed in an organic binder are widely used as terminal electrode materials for multilayer ceramic capacitors. These conductive pastes must be electrically conductive after firing and are also required to have such properties as good adhesion to the capacitor assembly before and after a firing treatment. For example, U.S. Pat. No. 3,922,387 discloses a composition comprising noble metals with a nickel oxide addition to improve adhesion.

A number of related problems have arisen with the growth over the past few years in the use of high-density surface mount technology. For instance, a relatively high temperature of 800 to 900° C. is needed to fire present conductive pastes. When the terminal electrodes on a capacitor are formed by firing within the above temperature range, this process creates large internal stresses within the capacitor because of diffusion of the metal constituents within the paste to the capacitor's internal electrode, sintering shrinkage at junctions between the terminal electrodes and the capacitor assembly (e.g., ceramic), and diffusion of the inorganic binder components in the paste through the capacitor assembly. The result is problems such as crack formation in the capacitor assembly due to rapid temperature changes that take place during soldering of the chip capacitor to the circuit board or during solder repair and crack formation in the capacitor when the substrate warps due to the external application of bending forces thereto.

As noted, because the electrically conductive pastes have a relatively high firing temperature when used in terminal electrodes, they have a low thermal shock resistance during soldering and related processes. Moreover, they have an inadequate strength to warping or bending of the circuit board on which the chip capacitors are mounted (i.e., flexural strength). As a result, cracking readily arises due to internal stresses within the capacitor assembly during firing, which causes low reliability. When the conductive pastes are fired at relatively low temperatures of 650 to 780° C., the flexural strength improves, but the density is inadequate and other characteristics of the chip capacitor decline, making it impossible to achieve good reliability.

It is therefore the object of the present invention to provide novel compositions which, when fired in a relatively low temperature range of 700 to 770° C., are capable of forming terminal electrodes that satisfy the various characteristics desired for use in multilayer ceramic capacitors, and that have a high mechanical strength and a good reliability such as thermal impact resistance.

In addition, the presence of a metal oxide in the inventive composition enables a sintered film of suitable density to be obtained at a low firing temperature of 700 to 770° C. Moreover, the density of the sintered film does not change much within a firing temperature range of 700 to 770° C., thereby ensuring a broad process window.

DETAILED DESCRIPTION OF THE INVENTION

It was discovered that, by including a specific metal oxide within a conductive paste, terminal electrodes endowed with a high density and a high reliability are formed at a relatively low firing temperature. Accordingly, the invention provides terminal electrode compositions for multilayer capacitors, which compositions contain up to 10 wt % of metal oxide in the paste composition.

The metal oxide included in the composition is at least one selected from the group $SnO_2$ powder, $V_2O_5$ powder and $MoO_3$ powder, and is preferably a finely divided powder. The average particle size is in a range of 0.01 to 5 µm.

The metal oxide content is in the range of about 0.1 to 10 wt %, and preferably 0.1 to 8.0 wt % and all ranges contained therein, based on the total paste composition. At less than 0.1 wt %, the desired effects are limited. On the other hand, at more than 10 wt %, the resistivity of the fired film rises resulting into elevating the equivalent series resistance. Equivalent series resistance means a total resistance when an actual circuit is substituted by a combination of liner passive elements including resistor, capacity and impedance approximately and equivalently.

Use of the above-described metal oxide in the invention promotes sintering at a temperature of about 700° C. and inhibits rapid sintering at temperatures above 770° C. Hence, terminal electrodes of suitable denseness are achieved within a firing temperature range of 700 to 770° C.

The base metal particles are selected from a copper powder, a nickel powder, a copper-nickel alloy powder or mixtures thereof. The copper powder is preferred. Copper powder particles are selected from spherical or indeterminate shape and have an average particle size of 0.3 to 30 µm, flake-like copper particles having a particle size of 0.1 to 30 µm, and mixtures thereof are especially preferred. Base metal particles that are too large compromise the density of the terminal electrode produced therefrom. On the other hand, if the particle size is too small, the dispersion properties differ from those of the organic binder, giving rise to a change in rheology that makes it difficult to achieve an ideal coated shape.

The content of base metal particles within the paste is 45.0 to 85.0 wt %. Below this range, a dense sintered film is not obtained, whereas above this range, the desired paste viscosity is not achieved.

The specific composition of a glass frit used as the inorganic binder of the invention is not critical, preferred glasses are free of lead, cadmium and bismuth because of recent environmental concerns. The most preferred frits are borosilicate glasses containing alkaline earth metal oxides. The softening point of the glass frit is closely associated with the firing temperature. Too high a softening point inhibits sintering, whereas too low a softening point promotes sintering. To keep the composition from undergoing an excessive degree of sintering, yet allow it to achieve a suitable degree of density, it is preferable for the glass softening point to be set within a range of 500 to 650° C.

The composition has a glass frit content from about 5 wt %, and preferably from 8 to 12 wt %, based on the overall composition. When too little glass frit is added at a firing temperature of 700 to 770° C., a fired film having sufficient density to serve as a barrier to the plating solution cannot be obtained and adhesion to the capacitor assembly is inadequate. On the other hand, the addition of too much glass frit causes glass components to rise to the surface of the fired film, greatly compromising the plating adhesion. The glass frit is preferably a finely divided powder having a particle size of 0.5 to 20 μm and especially 1 to 10 μm. Too large a particle size results in a low density, whereas too small a particle size results in dispersion properties that differ from those of the organic binder, altering the rheology and making it difficult to achieve an ideal coated shape.

In the practice of the invention, the above-described metal oxide particles, base metal particles and inorganic binder are dispersed in an organic medium to form a paste composition of which the paste is coated onto the terminal electrode-forming sites of the multilayer ceramic capacitor and fired at a temperature of 700 to 770° C. to form terminal electrodes. Nickel or solder plating is then applied as a soldering surface to the terminal electrodes after they have been fired, thereby creating finished terminal electrodes.

The organic medium used in the electrically conductive paste compositions is one that burns completely at the firing temperature and leaves no incompletely combusted material in the fired film. The organic medium is typically added in an amount of 10 to 35 wt %, and preferably 15 to 30 wt %, based on the weight of the paste composition. A wide variety of inert liquids can be used as organic medium. The organic medium must be one in which the solids are dispersible with an adequate degree of stability. The rheological properties of the medium must be such that they lend good application properties to the composition. Such properties include: dispersion of solids with an adequate degree of stability, good application of composition, appropriate viscosity, thixotropic, appropriate wettability of the substrate and the solids, a good drying rate, good firing properties, and a dried film strength sufficient to withstand rough handling. The organic medium is conventional in the art and is typically a solution of polymeror resins in solvent(s). The most frequently used resin for this purpose is ethyl cellulose. Other examples of resins and polymers include ethylhydroxyethyl cellulose, wood rosin, mixtures of ethyl cellulose and phenolic resins, polymethacrylates of lower alcohols, monobutyl ether of ethylene glycol monoacetate, acrylic and styrene polymers can also be used. The most widely used solvents found in thick film compositions are ethyl acetate and terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. Various combinations of these and other solvents are formulated to obtain the viscosity and volatility requirements desired.

In addition, the thick film composition can also include other components that are known in the art of thick film compositions to enhance various properties of the composition, such as adhesion, sintering, processing, brazeability, solderability, reliability, etc., during processing.

The capacitor composition of the invention makes use of a nickel or solder plating surface to ensure reliability and facilitate the soldering operation. By enabling the composition to have a suitable density, the composition can prevent the plating solution from penetrating into the terminal electrodes and into the internal electrodes during plating.

EXAMPLES

Example 1

A spherical copper powder having an average particle size of 3 μm (71.1 wt %), $SnO_2$ powder (0.7 wt %), glass frit (10.2 wt %), and an organic vehicle (18 wt %) (solution of 22 wt % methyl methacrylates (MMA) having weight average molecular weight of 200,000 in 78 wt % butylcarbitolacetate) were each weighed out in the indicated amounts and uniformly dispersed by blending in a three-roll mill to form a paste.

The glass frit had the composition by weight:
35.0% BaO
23.1% $B_2O_3$
13.5% SrO
12.5% $SiO_2$
4.5% ZnO
3.7% MgO
2.4% $Al_2O_3$
2.3% $Na_2O$
1.2% $SnO_2$
1.0% $TiO_2$
0.4% $K_2O$
0.4% LiO Example 2

A spherical copper powder having an average particle size of 3 μm (70 wt %), $SnO_2$ powder (2 wt %), glass frit (10 wt %) of Example 1 and an organic vehicle (18 wt %) were each weighed out and uniformly dispersed by blending in a three-roll mill to form a base.

Example 3

A spherical copper powder having an average particle size of 3 μm (70.9 wt %), $V_2O_5$ powder (1.0 wt %), glass frit (10.1 wt %) of Example 1 and an organic vehicle (18 wt %) were each weighed out and uniformly dispersed by blending in a three-roll mill to form a base.

Example 4

A spherical copper powder having an average particle size of 3 μm (70.6 wt %), $MoO_3$ powder (1.4 wt %), glass frit (10.1 wt %) of Example 1 and an organic vehicle (18 wt %) were each weighed out and uniformly dispersed by blending in a three-roll mill to form a base.

Comparative Example 5

A spherical copper powder having an average particle size of 3 μm (62.5 wt %), $SnO_2$ powder (11.4 wt %), glass frit (8.9 wt %) of Example 1 and an organic vehicle (17.1 wt %) were each weighed out and uniformly dispersed by blending in a three-roll mill to form a base.

1

Comparative Example 6

A spherical copper powder having an average particle size of 3 μm (71.8 wt %), glass frit (10.2 wt %) of Example 1 and an organic vehicle (18 wt %) were each weighed out and uniformly dispersed by blending in a three-roll mill to form a paste. A film density of this comparative example when fired at 725° C. is inferior as seen in Table 1. The composition is required to maintain a high ranked film density regardless the firing temperature through a range from 700 to 950° C.

Test Method

The pastes formulated as described above were coated onto multilayer ceramic capacitor chips and fired at a temperature of 725° C., 750° C. or 775° C. in a nitrogen atmosphere to prepare test pieces, which were then evaluated to determine their fired density and assess the degree to which glass components rose to the surface of the fired film. Fired density was rated by examining a cross-section of the fired film under a scanning electron microscope. Glass rise to the film surface was rated by examining the surface of the fired film under a metal microscope. The resistivity was determined by measuring the resistance of a conductor that had been printed and fired at 750° C. on an aluminum substrate.

The ratings, on a scale of 5 (best) to 1 (worst), are shown in Table 1. A rating of 3 or higher for any of the above properties posed no practical problems.

TABLE 1

|  | EX 1 | EX 2 | EX 3 | EX 4 | EX 5 | EX 6 |
|---|---|---|---|---|---|---|
| 3 μM Cu powder (wt %) | 71.1 | 70.0 | 70.9 | 70.5 | 62.5 | 71.7 |
| $SnO_2$ powder (wt %) | 0.7 | 2.0 |  |  | 11.4 |  |
| $V_2O_5$ powder (wt %) |  |  | 1.0 |  |  |  |
| $MoO_3$ powder (wt %) |  |  |  | 1.4 |  |  |
| Glass frit (wt %) | 10.2 | 10.0 | 10.1 | 10.1 | 8.9 | 10.3 |
| Organic vehicle (wt %) | 18.0 | 18.0 | 18.0 | 18.0 | 17.1 | 18.0 |
| Total (wt %) | 100.0 | 100.0 | 100.0 | 100.0 | 100 | 100.0 |
| Resistivity (750° C.) | 5 | 3 | 4 | 4 | 1 | 5 |
| Fired film density |  |  |  |  |  |  |
| 725° C. | 4 | 5 | 4 | 4 | 2 | 2 |
| 750° C. | 4 | 5 | 4 | 4 | 3 | 4 |
| 775° C. | 4 | 5 | 4 | 4 | 4 | 5 |
| Glass rise to surface of fired film |  |  |  |  |  |  |
| 725° C. | 5 | 5 | 5 | 5 | 5 | 5 |
| 750° C. | 5 | 5 | 5 | 5 | 5 | 5 |
| 775° C. | 4 | 5 | 4 | 4 | 5 | 2 |

What is claimed is:

1. An electrically conductive paste composition, based an total composition, comprising:

45.0 to 85.0 wt % of base metal particles selected from copper powder, nickel powder, copper-nickel alloy powder and mixtures thereof;

5 to 15 wt % glass frit; and 0.1 to 10 wt % $SnO_2$ metal oxide particles; and wherein the particles are dispersed in organic medium.

2. The conductive paste of claim 1 comprising 0.1 to 8 wt % metal oxide.

3. A terminal electrode for multilayer capacitors comprising the paste composition of claim 2.

4. The conductive paste of any one of claims 1 or 2, wherein said organic medium is 10–35 wt % of the paste composition.

5. The conductive paste of claim 4, wherein said organic medium comprises methyl methacrylate and butylcarbitolacetate.

6. The conductive paste of claim 1, wherein said organic medium comprises methyl methacrylate and butylcarbitolacetae.

7. A method of forming a terminal electrode comprising:

(a) forming the conductive paste of claim 6;

(b) coating the composition of (a) onto a terminal electrode-forming site of a multilayer capacitor; and (c) firing the multilayer capacitor in (b) to form a finished terminal electrode.

8. A multilayer capacitor utilizing the conductive paste of claim 6.

9. A terminal electrode for multilayer capacitors comprising the paste composition of claim 1.

* * * * *